Dec. 20, 1960   C. T. PESEK ET AL   2,964,951
CONTROL APPARATUS
Filed June 17, 1958   5 Sheets-Sheet 1

INVENTORS
CLARENCE T. PESEK
MATHIAS H. RIESGRAF
BY
ATTORNEY

Dec. 20, 1960 C. T. PESEK ET AL 2,964,951
CONTROL APPARATUS
Filed June 17, 1958 5 Sheets-Sheet 2

INVENTORS
CLARENCE T. PESEK
MATHIAS H. RIESGRAF
BY
Roger W. Jensen
ATTORNEY

Dec. 20, 1960   C. T. PESEK ET AL   2,964,951
CONTROL APPARATUS

Filed June 17, 1958   5 Sheets-Sheet 3

INVENTORS
CLARENCE T. PESEK
MATHIAS H. RIESGRAF
BY
ATTORNEY

Dec. 20, 1960    C. T. PESEK ET AL    2,964,951
CONTROL APPARATUS
Filed June 17, 1958    5 Sheets-Sheet 4

INVENTORS
CLARENCE T. PESEK
MATHIAS H. RIESGRAF
BY
ATTORNEY

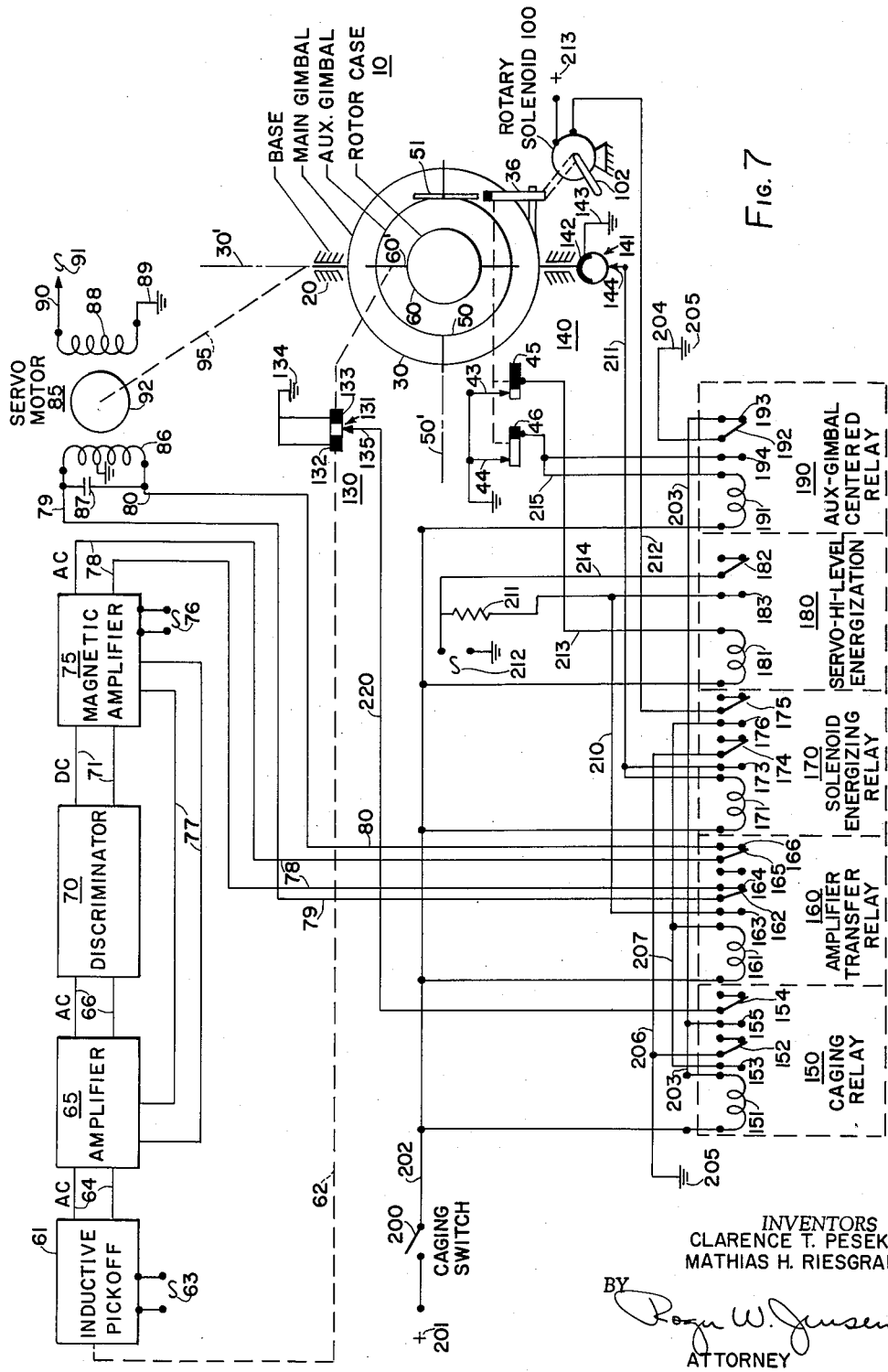

United States Patent Office 2,964,951
Patented Dec. 20, 1960

2,964,951

CONTROL APPARATUS

Clarence T. Pesek, Minneapolis, and Mathias H. Riesgraf, Crystal, Minn., assignors to Minneapolis-Honeywell Regulator Company, Minneapolis, Minn., a corporation of Delaware Filed June 17, 1958, Ser. No. 742,597

14 Claims. (Cl. 74—5.1)

This invention pertains to control apparatus for gyroscopes and more specifically pertains to a caging and centering apparatus for gyroscopes known as redundant gimbal gyros.

Redundant gimbal gyros are used as an all attitude displacement type gyro and possess the advantage over the usual two gimbal displacement gyros in that they do not have the "gimbal lock" problems characteristic of two gimbal gyros.

The redundant gimbal gyros in their simplest form include a rotor mounted in a rotor case, a universal support for the rotor case including a base, a main gimbal mounted on the base for movement about a first axis and an auxiliary gimbal mounted on the main gimbal for movement about an axis perpendicular to the axis of the main gimbal. The rotor case is pivotally mounted on the auxiliary gimbal for movement about an axis that is perpendicular to the axis of the auxiliary gimbal. Pickoff means are provided for sensing relative movement between the rotor case and the auxiliary gimbal and provide a signal to servomotor means which are connected to the main gimbal. The pickoff means energizes the servomotor means in a sense so as to servo the main gimbal to the rotor case. In other words the main gimbal is always driven in a direction in response to signals from the pickoff means so as to maintain the attitude of the rotor case fixed. In this manner the spin axis of the rotor in the rotor case can never become aligned with the auxiliary gimbal axis and gimbal lock is thus prevented.

Redundant gimbal gyros of the type above described are well known in the art. The present invention provides a centering and caging apparatus for redundant gimbal gyros which is adapted to be used when desired for orienting all of the gimbals and the rotor case of the gyro relative to fixed references.

It is an object of the present invention therefore to provide an improved control apparatus.

Another object of the invention is to provide a means for moving the main gimbal, the auxiliary gimbal and the rotor case of a redundant gimbal gyro to preselected positions when desired.

A further object is to provide an improved redundant gimbal gyro.

These and further objects will become apparent from a reading of the following specification and appended claims in conjunction with the drawings in which:

Figure 7 is a schematic diagram of the gyroscopic apparatus together with a schematic wiring diagram of its control system.

Figure 1:
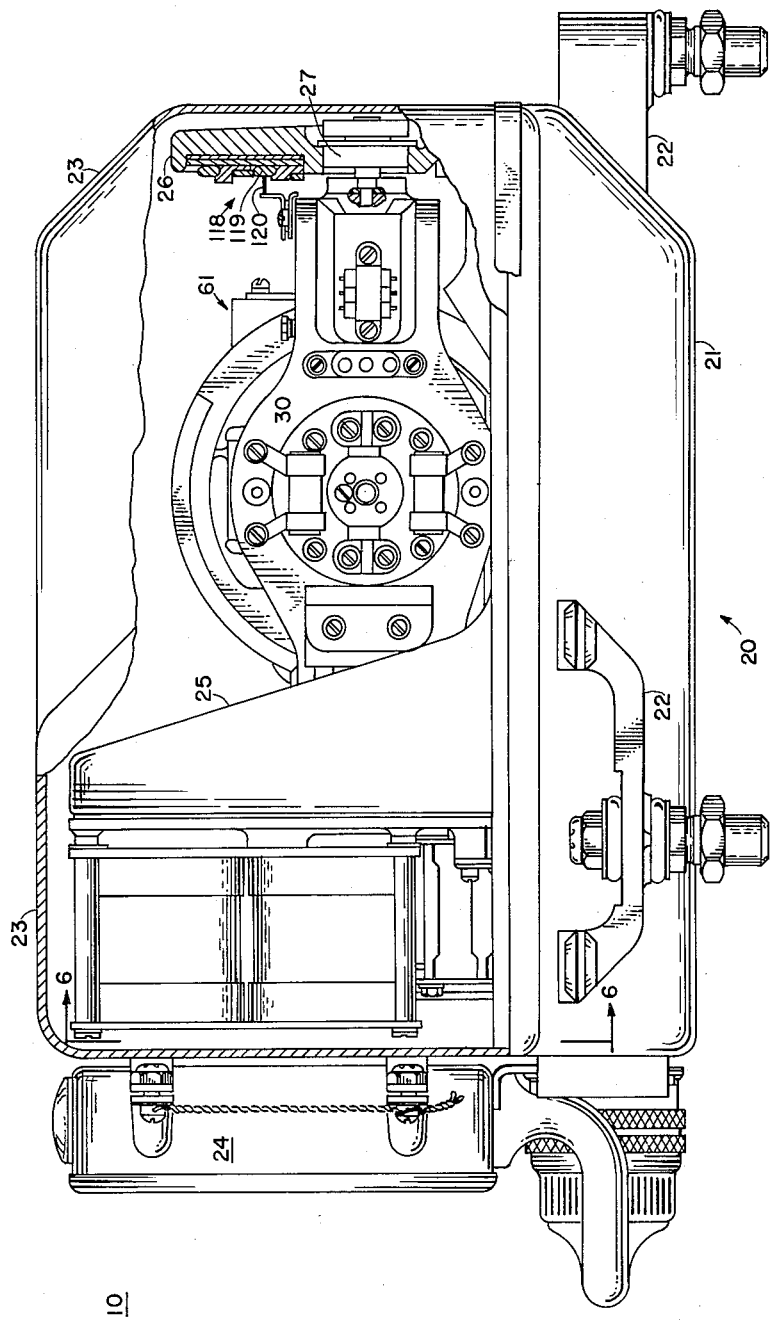
Figure 1 is a side view of a redundant gimbal gyro with a portion of the cover removed to disclose interior details.

Referring to Figure 7, a redundant gimbal gyro is generally identified by reference numeral 10 and comprises a base or support member 20 which provides a rotational support for a main or first gimbal 30 so that the main gimbal may have a rotational axis 30'. The main gimbal in turn supports an auxiliary or middle or second gimbal 50 for rotation about an auxiliary gimbal axis 50', axis 50' being perpendicular to axis 30'. The auxiliary gimbal 50 in turn provides a rotational support for a rotor case or third gimbal 60 for rotation about an axis 60', the axis 60' being perpendicular to axis 50'.

Pickoff means 61 are associated with the rotor case 60 and on Figure 7 this is shown schematically with the means 61 being connected to the rotor case 60 through a linkage 62. In actual practice the pickoff means 61 could comprise a potentiometer type pickoff or an inductive type pickoff or other type of pickoff including means positioned by the rotor case 60 and other means secured to the auxiliary or middle gimbal 50. The purpose of the pickoff means 61 is to develop a signal as a function of relative rotation between the rotor case 60 and the auxiliary gimbal 50. The signal produced has a sense proportional to the sense of relative rotation between these two elements and has a magnitude proportional to the amount of deviation or relative movement between the elements away from their normal or neutral or null position. As shown the pickoff means is an inductive pickoff producing an A.C. signal of a phase and magnitude according to the sense and magnitude of deviation of the rotor case 60 relative to the auxiliary gimbal 50. The pickoff means 61 is energized from a suitable source of alternating current 63 and transmits its output signal through a pair of lead members 64 to an amplifier 65 which may be of any suitable type and which in turn transmits its amplified signal through a pair of leads 66 to a discriminator member 70 which may be of any suitable type for demodulating the amplified A.C. signal applied to it so as to produce a D.C. signal of a polarity and magnitude corresponding to the phase and magnitude of the A.C. signal developed by the pickoff means 61. The discriminator 70 transmits its D.C. signal through a pair of leads 71 to a magnetic amplifier member 75 of any suitable type which takes the D.C. signal applied thereto, amplifies it, and has a resultant A.C. signal similar to the original A.C. signal developed by the pickoff means 61 but of greatly increased magnitude. The magnetic amplifier means 75 is energized by a suitable source of alternating current 76 and further includes a pair of output leads 77 which apply a negative feedback signal to the amplifier means 65 for stabilization purposes. The magnetic amplifier means 75 further includes a pair of output leads 78 which are connected through normally closed contacts of amplifier transfer relay means to be discussed in more detail below to a pair of leads 79 and 80 which serve as input leads to the amplifier or control winding 86 of a servomotor 85. Winding 86 is tapped and connected to ground at its midpoint and its two ends are connected respectively to leads 79 and 80. A suitable condenser is connected in parallel with winding 86 in the usual manner. Servomotor means 85 further includes a line winding 88 one end of which is grounded as at 89 and the other end of which is connected by means of a lead 90 to a suitable source of alternating current 91. A mechanical linkage identified in Figure 7 by the reference numeral 95 connects the rotor member 92 of the servomotor means 85 to the main gimbal 30 so that rotation of the rotor member 92 causes relative rotation between the base member 20 and the main gimbal 30 of the redundant gimbal gyro 10. The normal operation of the redundant gimbal gyro is for the servomotor means 85 to keep the main gimbal 30 servoed to the rotor case 60. Thus, any deviation or relative movement or rotation between the rotor case 60 and the auxiliary or middle gimbal 50 results in a signal being produced by the inductive pickoff means 61 which is amplified by means 65—70—75 and applied to the control winding 86 of the servomotor means 85 so as to drive the main gimbal in the same sense as the original movement of the rotor case 60. This action always keeps the spin axis of the rotor (which of course is perpendicular to the axis 60' of the rotor case) perpendicular to axis 50' or the auxiliary or middle gimbal axis.

Pickoff means, not shown, associated with the auxiliary gimbal 50 and the main gimbal 30 are provided usually for developing signals indicative of any deviations of the base member in space. If the device 10 is used as a vertical reference then vertical sensors such as mercury switches will be provided to control torque motor means for maintaining the spin axis of the rotor vertical with respect to the earth.

Figure 2:
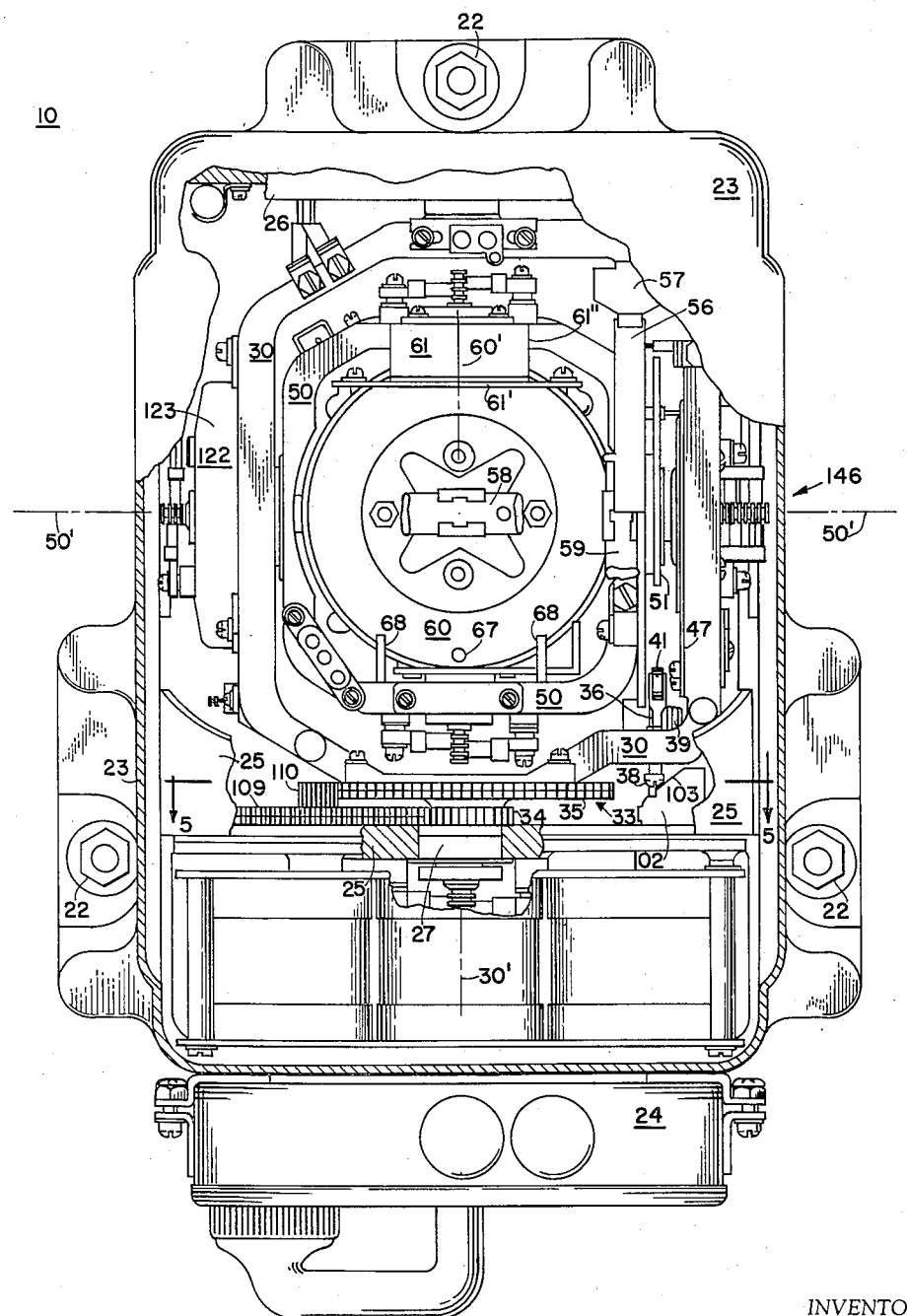
Figure 2 is a top view of the gyro shown in Figure 1 again with a portion of the cover removed.

Referring to Figures 1 and 2 the redundant gimbal gyro 10 is shown in considerably more detail. The base means 20 includes a lower portion 21 which is provided with three triangularly located mounting members 22 for the purpose of accurately positioning the base member 20 relative to the device such as an airframe upon which it is to be mounted. An upper housing member 23, a general box-like cover member open at the bottom end as shown in Figure 1, is adapted to fit snugly relative to the lower housing member 21 and to be sealed relative thereto so that the entire contents of the housing or base 20 are hermetically sealed. Also mounted on the device as shown in Figure 1 and Figure 2 is an auxiliary housing 24 which includes the amplifier means 65.

The housing or base member 20 further includes a pair of upstanding portions 25 and 26 provided with suitable bearing means 27 which define the rotational axis 30' for the main gimbal member 30.

The plan view of the main gimbal 30 is shown clearly in Figure 2 and generally it comprises a rectangular ring member having generally parallel sides and which is provided at opposite ends with suitable pivot means 31 which cooperate with the bearing means 27 positioned in the base for rotatably supporting the main gimbal 30 relative to the base. A gear member 33 is mounted integrally with gimbal 30 and has two spur gear sections 34 and 35, the planes of which both are perpendicular to the main gimbal axis 30'. Spur gear portion 35 is of a larger diameter than portion 34 and will be discussed in greater detail later. Gear means 33 in general are used for transmitting rotation of the servo motor rotor 92 to the main gimbal 30 and for actuating additional pickoff means.

Figure 3:
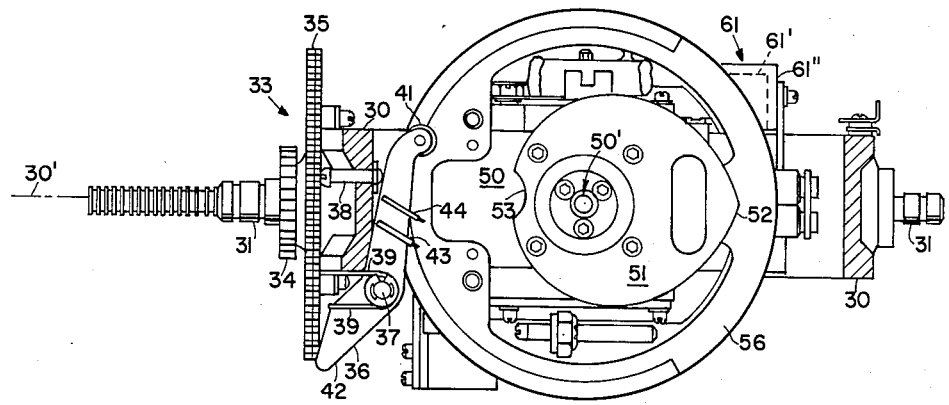
Figure 3 is a detailed view of the main gimbal, auxiliary gimbal, and rotor case of the gyro shown in Figures 1 and 2 with a portion of the main gimbal removed.

A caging lever arm 36 is pivotally mounted as at 37 (see Figures 3 and 4) on the main gimbal 30 for limited rotation relative thereto about an axis which is spaced from and perpendicular to the main gimbal axis 30'. As shown in Figure 3 the caging lever arm 36 is in its normal position being held against an adjustable stop means 38 by a suitable spring means 39 thus Spring means 39 tends to rotate the caging lever arm 36 in a counter-clockwise direction about pivot point 37 as shown in Figure 3 and resiliently biases or restrains any clockwise rotation of the arm 36 as shown in Figure 3.

A cam follower 41 is pivotally mounted on one end of the caging lever arm 36 and a stop engaging surface 42 is provided on the opposite end of arm 36. A pair of wiper members 43 and 44 are mounted on the caging lever arm 36 and are electrically connected thereto (caging lever arm 36 being grounded) and are adapted to coact when caging lever arm 36 is rotated relative to the gimbal 30 with a pair of sectors 45 and 46 respectively which in turn are mounted on a suitable support 47 which is fastened by suitable means to the gimbal 30. The sector 45 is positioned relative to the sector 46 so that contact between sector 45 and wiper 43 will occur first when lever arm 36 rotates clockwise as shown in Figure 3 relative to the gimbal 30 and upon further or greater rotation contact will be made between wipers 44 and sector 46. The function of the switch means 43, 44, 45 and 46 will be discussed below in connection with the caging operation.

The auxiliary or middle gimbal 50 also is shown in plan view in Figure 2 and also is a ring generally shaped similarly to main gimbal 30 except being of a smaller size so that it may fit within the main gimbal 30. Bearing means and pivot means similar to the bearing means 27 and 31 respectively for the main gimbal are provided on the auxiliary gimbal 50 and the main gimbal 30 for supporting the auxiliary gimbal 50 for rotation relative to the main gimbal 30 about an axis 50' which as shown in Figure 2 is perpendicular to the main gimbal axis 30'. A cam 51 having a general heart shaped configuration is mounted on the auxiliary or middle gimbal 50 for rotation therewith. Cam member 51 is generally symmetrically shaped and has a high point 52 and a low point or detent section 53. Cam member 51 is mounted on the middle gimbal 50 and caging lever arm 36 is mounted on the main gimbal 30 in such a position so that when caging lever arm 36 is rotated clockwise about its pivotal point 37 as shown in Figure 3 the cam follower 41 will come into contact with the outer periphery of the cam 51. When this action occurs the force applied to the caging lever arm 36 results in rotation of the auxiliary or middle gimbal 50 relative to the main gimbal 30.

An armature or rotor member 56 is mounted on the auxiliary gimbal 50 for rotation therewith and cooperates with stator means 57 mounted on the main gimbal 30. Stator and rotor means 57 and 56 together comprises torque motor means which may be controlled in the usual fashion by a vertical sensor such as a mercury switch 58 mounted on the rotor case 60 for maintaining the rotor case vertical. A second vertical sensor such as a mercury switch 59 is mounted on the middle gimbal 50 for the control of additional torque motor means (not shown) for maintaining the middle gimbal vertical.

The rotor case 60 as shown clearly in Figure 2, is of a general spherical configuration and contains a suitable rotor member, not shown. The rotor case 60 is of such a size so that it may fit within the middle or auxiliary gimbal 50. Again, suitable bearing and pivot means are provided respectively in the middle gimbal 50 and on the rotor case 60 so that the rotor case 60 may pivot relative to the middle gimbal 50 about an axis 60' which is perpendicular to the middle gimbal axis 50'. The rotor element, not shown, within the rotor case 60 is adapted to rotate in the usual manner about an axis which is perpendicular to the rotor case axis 60'. The rotor case 60 is limited in its freedom of rotation relative to auxiliary gimbal 50 by stop means shown in Figure 2. The stop means includes a pin member 67 attached to the rotor case 60 and a pair of spaced stop arms 68 mounted on the auxiliary gimbal 50. The rotor case need not have too much freedom of rotation relative to the auxiliary gimbal 50, a range of plus or minus 30 degrees from null or neutral having been found satisfactory.

The pickoff means 61 shown schematically in Figure 7 are also shown in Figures 1, 2, and 3 and comprise a member 61' secured to the rotor case and a member 61" connected to the auxiliary gimbal 50. Pickoff means 61 are not shown in extreme detail but it should be understood that the function thereof is to sense any relative rotation between the rotor case and the auxiliary gimbal 50 and to develop a signal as a result of such rotation which is of a sense and magnitude proportional to the sense and magnitude of the deviation. It will be understood that pickoff means 61 is energized by suitable means not shown.

Figure 5:
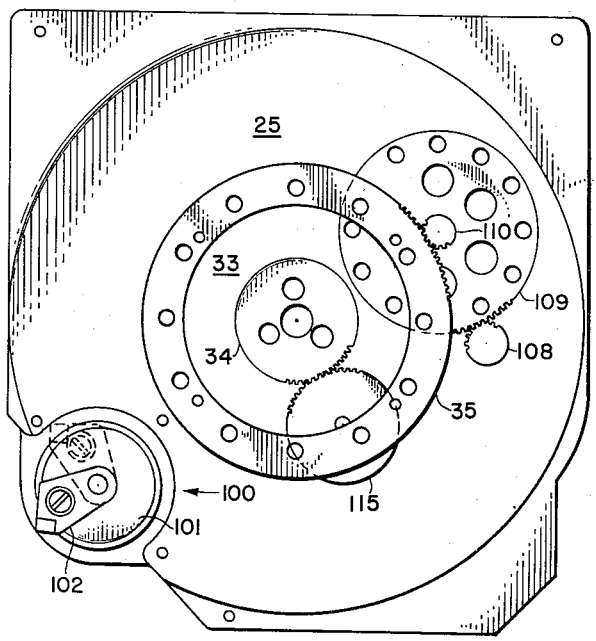
Figure 5 is a view of the gyro showing details in the gearing and of the stop means as viewed along section lines 5—5 in Figure 2.

A main gimbal rotation limiting means 100 is provided and comprises a rotary solenoid housing member 101 shown in Figure 5) which is mounted on the upstanding portion 25 of base member 20. Stop means 100 includes a rotatable member 102 shown in Figure 5 in its normal position corresponding to the stop means 100 being de-energized. The movable member 102 is also shown in Figure 2, in which view a beveled surface 103 thereon is visible. The rotatable member 102 is adapted, upon energization of the stop means 100, to be rotated clockwise as shown in Figure 5 to a position as shown by the dotted lines. The rotation of movable member 102 is approximately 90 degrees about its pivotal axis. When the stop means 100 is de-energized the movable arm 102 offers no restriction to rotation of the main gimbal 30 about its axis 30'. However, when the stop means 100 is energized causing the movable arm 102 to rotate to the dotted line position as shown in Figure 5 then it serves as a limiting means for limiting the rotation of the main gimbal 30 relative to the base 20. The limiting means is a function of an interference between the movable arm 102 and the stop engaging surface 42 on the caging lever arm 36. The stop means 100 is only energized when it is desired to cage the gyro and in that mode of operation the outer gimbal is rotated by the servo means 85 so that surface 42 on the caging lever arm 36 comes into engagement with the beveled surface 103 on the movable member 102 of the stop means 100. Further force exerted on the main gimbal 30 through the action of the servo means 85 results in the caging lever arm 36 being rotated about its pivotal axis 37 (clockwise as shown in Figure 3) so that the bias or restraint of spring means 39 is overcome and cam follower 41 is moved into engagement with the periphery of cam member 51 thus rotating the middle gimbal 50 relative to the main gimbal 30.

Figure 6:
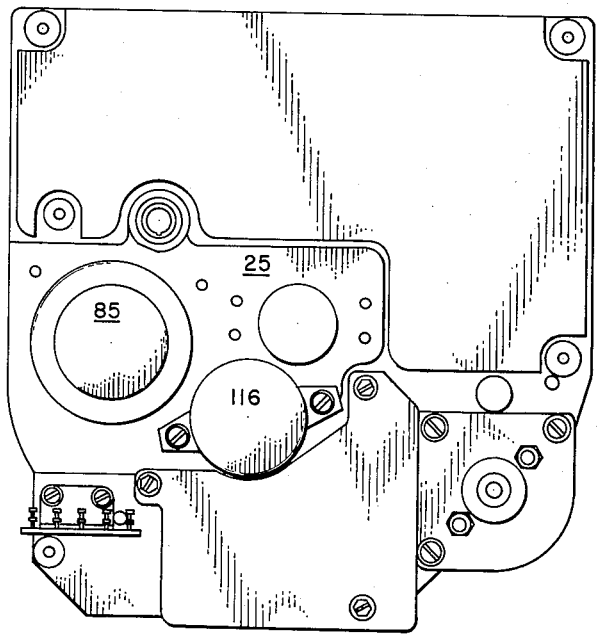
Figure 6 is an end view of the gyro inside of the cover member as viewed along section lines 6—6 of Figure 1.

The servomotor 85 is mounted on the upstanding portion 25 of the base as shown in Figure 6. Servomotor 85 may be of conventional design and includes a shaft upon which is mounted a small spur gear 108 shown in Figure 5. Spur gear 108 is adapted to engage with another spur gear 109 of larger diameter which in turn has a spur gear portion 110 of relatively small diameter integral therewith which coacts with spur gear portion 35 of gear means 33. It will be appreciated that rotation of the rotor member 92 of the servomotor means 85 is transmitted through gears 108, 109, 110 and 35 so as to rotate the main gimbal 30 relative to the base 20.

A further spur gear 115 is journaled on portion 25 of base member 20 and is connected to a resolver type pickoff 116 shown in Figure 6. Gear 115 is adapted to be rotated by portion 34 of gear means 33 and the function of this last described means is to drive the rotor member, not shown, of the resolver means 116 as a function of relative rotation between the main gimbal 30 and the base 20. The resolver means 116 is used for purposes not connected with the present invention.

Additional pickoff means are provided on the gyroscope. Included in this category is a potentiometer type pickoff 118 including a winding 119 secured to portion 26 of the base and a wiper member 120 secured to the outer gimbal 30. Pickoff means 118 thus senses relative rotation between the base and the outer or main gimbal 30. A synchro type pickoff 122 is provided as a means of sensing relative rotation between the middle gimbal 50 and the main gimbal 30. Synchro 122 is of pancake type construction including a housing 123 enclosing a stator and a rotor member not shown which is adapted to be rotated integrally with the middle gimbal 50. As such the synchro device 122 has utility for purposes not associated with the present invention for control or indication purposes as a function of relative rotation between the main gimbal 30 and middle gimbal 50.

In addition to the pickoff means 61 associated with the rotor case 60 and the middle or auxiliary gimbal 50 there is a sector switch type device 130 shown schematically in Figure 7. Sector switch means 130 includes an insulative bar like member 131 which is adapted to be moved by the rotor case 60 as indicated by the linkage 62. Bar member 131 has a pair of metalized portions or contacts 132 and 133 which are connected together to ground as at 134. The center portion of bar member 131 is non-metalized and a wiper member 135 cooperates with the bar member 131. When the rotor case is at its null or neutral or mid position relative to the middle gimbal 50 then the sector switch 130 is positioned as shown in Figure 7. In this position there is no electrical continuity between ground 134 and wiper 135. However, when the rotor case rotates relative to the middle gimbal 50 in one sense or the other by a preselected angular amount then the wiper 135 comes into contact with metalized portion 132 or 133 depending upon the sense of rotation so as to connect wiper 135 to ground 134.

A further sector switch 140 shown in Figure 7 is associated with the main gimbal 30 and includes a member 141 rotatable with gimbal 30 about the main gimbal axis 30'. Member 141 has a metalized portion 142 thereon which is connected to ground 143 and coacting with member 141 is a wiper member 144. The metalized portion 142 extends around a portion of the periphery of the member 141 so that for certain angular positions of the main gimbal 30 relative to the base 20 there is continuity between wiper 144 and ground 143 while in other positions of the gimbal there is an open circuit between wiper 144 and ground.

Sector switches 140 and 130 may be of any suitable type and may if desired be of the type similar to the slip rings and wipers 146 shown in Figure 2.

A plurality of relays are provided for use in the control circuit for caging and uncaging the gyro 10. Included is a caging relay 150 including a coil 151, movable contacts 152 and 154 having in contacts 153 and 155 respectively. There is also provided an amplifier transfer relay 160 having a coil 161, a movable contact 162 having an out contact 164 and an in contact 163, and a second movable contact 165 having an out contact 166. There is also provided a solenoid energizing relay 170 having a winding 171, a movable contact 174 having an in contact 173, and a movable contact 175 having an in contact 176. There is also provided a servomotor high level energization relay 180 having a winding 181 and a movable contact 182 which coacts with an in contact 183. Finally there is provided an auxiliary gimbal centered relay 190 having a winding 191 and a movable contact 192 which coacts with an out contact 193 and an in contact 194.

The normal operation of the gyro 10 has been discussed above, it being understood that suitable means such as slips rings are used for bringing power into the rotor case 60 so as to cause the spin motor rotor to rotate and for energizing other auxiliary means such as the torque motor means. As indicated the normal operation of the gyro is to have the outer gimbal 30 slaved to the rotor case 60 to maintain the spin rotor axis perpendicular to the middle gimbal axis 50'.

When it is desired to cage and center the gimbals and rotor case a normally open caging switch 200 is closed which then permits power from a suitable source of direct current 201 to be applied to a lead 202 which is connected to one side of all of coils 151, 161, 171, 181, and 191 of relays 150, 160, 170, 180, and 190 respectively. The other side of winding 151 is connected through a lead 203 to out contact 193 of the auxiliary gimbal centered relay 190 and is further connected to in contact 155 of caging relay 150. The movable contact arm 192 of relay 190 is connected through a lead 204 to ground 205 so the circuit as shown in Figure 7 (upon closing of switch 200), completes a circuit through winding 151 to ground, thus energizing the caging relay 150. The movable contact 152 of relay 150 is connected through a lead 206 to ground 205, said lead 206 also being connected to the movable contact arm 174 of the solenoid energized relay 170. The in contact 153 of relay 150 is connected through a lead 207 to the other side of winding 161 of the amplifier transfer relay 160 and is also connected through lead 207 to the in contact 176 of the solenoid energized relay 170. Thus energization of the caging relay 150 will complete a circuit between movable contact 152 and its in contact 153, thus connecting ground through lead 206 and the contacts 152 and 153 through lead 207 to the other side of winding 161 thus energizing the amplifier transfer relay 160. As indicated above, the output leads 78 from magnetic amplifier 75 are connected through the amplifier transfer relay 160. More specifically, leads 78 from the magnetic amplifier are connected to out contact 164 and movable contact 165 of the amplifier transfer relay 160. The movable contact 162 is connected to lead 79 which is connected to one side of the servomotor control winding 86 and the out contact 166 is connected through lead 80 to the other side of the winding 86. It will be appreciated that when the amplifier transfer relay 160 is energized that the separation of movable contacts 162 and 165 from out contacts 164 and 166 respectively will disengage the magnetic amplifier (and thus effectively disconnect the inductive pickoff 61) from the servomotor 85. The lead 210 connects in contact 163 through a voltage dropping resistor 211 to the ungrounded side of a source of suitable alternating current 212. Thus when the amplifier transfer relay 160 is energized lead 79 connected to one side of the winding 86 of servomotor 85 is connected through the voltage dropping resistor 211 to alternating current 212. This causes the servomotor 85 to rotate continuously in one direction, the circuit being completed through the winding 86 to its grounded center tap. Due to the action of the voltage dropping resistor 211 the initial degree of energization to the servomotor 85 is of such a value that the servomotor drives the main gimbal 30 at a relatively slow rate. As the main gimbal 30 is rotated by the servomotor means 85 there of course will be an accompanying relative rotation between the rotor case 60 and the auxiliary gimbal 50. In most cases the rotor case will be engaged by its stop means by this relative rotation and continued rotation of the main gimbal will tend to cause the auxiliary gimbal 50 to precess about its axis 50'. This is because the rotor case has no more freedom. The outer or main gimbal 30 is rotated to a point wherein continuity between ground 143 and wiper 144 is established. Wiper 144 is connected through a lead 211 to the other side of winding 171 of the solenoid energized relay 170 and is also connected to in contact 173 thereof. Thus the rotation of the outer gimbal 30 completes a circuit for energizing the winding 171 and the solenoid energized relay 170 pulls in, engaging movable contact arms 174 and 175 thereof with their cooperating in contacts 173 and 176 respectively. Movable contact arm 175 is connected through a lead 212 to the winding not shown, for the rotary solenoid 100. The other side of the winding is connected to a suitable source of direct current 213. When the solenoid energizing relay 170 is energized, then an energization path for the rotary solenoid 100 can be traced from the source of direct current 213 through the rotary solenoid winding, lead 212, movable contact 175, in contact 176, lead 207, in contact 153 and movable contact 152 of the caging relay 150, lead 206, to ground 205. The rotary solenoid 100 is thus energized and the rotatable arm 102 thereon is moved from the full line position as shown in Figure 7 to the dotted line position at which point it presents an interference to further rotation of the outer gimbal 30. Stop engaging surface 42 of the caging lever arm 36 thus comes into engagement with the inclined surface 103 on the movable member 102 of the stop means 100 and the force from the servomotor rotor 92 is transmitted so as to rotate caging lever arm 36 about its pivotal axis 37 against the restraint of resilient means 39. As the caging lever arm 36 rotates about its pivotal axis 37 against the restraint of the spring 39 there is continuity established between wiper 43 and sector portion 45 and, as shown in Figure 7, this will complete a circuit for the coil 181 of the servomotor high level energization relay 180, the other side of winding 181 being connected through a lead 213 to sector 45. The energization of relay 180 causes the movable contact 182 thereof to engage its cooperating in contact 183. Movable contact 182 is conected through a lead 214 to one side of the voltage dropping resistor 211, the other side of which connected through lead means 210 to the in contact 183. The action or function of the servomotor high level energization relay 180 therefore is to short out the voltage dropping resistor 211 in series with the energization for the servomotor and thus raises the voltage applied to the control winding 86 of the servomotor. The effect of this is to increase the torque output or power output from the servomotor 85 and to thereby increase the force applied through the caging lever arm 36 to the cam 51 attached to the middle gimbal 50.

As soon as the roller 41 on the caging lever arm 36 comes into engagement with the periphery of cam member 51 the rotor case 60 will begin to precess either toward the stop it is then engaging or toward the other stop the direction of precession being determined by the sense of rotation of auxiliary gimbal 50 relative to the main gimbal 30. As soon as the rotor case precesses to one extreme or the other (depending upon which way the middle gimbal is rotated through cam follower 41 and cam means 51) the spatial rigidity of the gyroscope is lost and thereafter continued pressure by cam follower 41 on cam 51 will result in rotation of the middle gimbal 50 relative to the outer gimbal or main gimbal 30. The relative rotation between the auxiliary or middle gimbal 50 and the main gimbal 30 accompanies the cam follower moving towards the detent portion 53. When the cam follower 41 gets into the detent 53 which corresponds to the middle gimbal being centered relative to the outer gimbal 30, the wiper 44 then engages the sector portion 46. Sector portion 46 is connected through a lead 215 to the other side of the winding 191 of the auxiliary gimbal centered relay 190. Thus when the wiper 44 comes into engagement with the sector 46 a complete energization circuit for winding 191 is effected and the relay 190 will then be energized, disengaging the movable contact from its out contact 193 and moving it into engagement with its in contact 194. The disengagement of movable contact 192 from out contact 193 removes the ground 205 from lead 203. The caging relay 150 will not be de-energized at this point however due to the action of the sector switch 130 associated with the rotor case 60. The wiper arm 135 of the sector switch 130 is connected through a suitable lead 220 to the movable contact 154 of the caging relay 150. As soon as the caging relay 150 was energized a redundant ground for the winding 151 was established through the movable contact 154 in contact 155, lead 203, and the sector switch 130. At the time that the middle gimbal is centered, as indicated above, the rotor will be to one stop or the other and consequently the wiper 135 of sector switch 130 will be in engagement with either metalized sectors 132 or 133 and accordingly the caging relay will remain energized, even after the auxiliary gimbal centered relay 190 is energized.

As the cam follower 41 on the caging lever arm 36 rolls down into the detent 53 of the cam 51 there is a tendency for the auxiliary gimbal 50 inertia to carry it somewhat past the exact centered position so that the cam follower 41 tends to ride up on the opposite side of the detent 53. This action in effect reverses the force being applied to the auxiliary or middle gimbal 50 (as compared to the rotational force applied to it as the cam follower 41 first came into contact with the cam 51) and the action serves to begin to precess the rotor case 60 in the opposite direction from which it first precessed. This precession of the rotor case 60 will continue due to the reaction between the cam follower 41 and the cam 51 and the rotor case will then proceed to precess back and forth between its stops. This action would continue indefinitely except for the function and action of the sector switch 130. As the rotor case 60 rotates relative to the middle or auxiliary gimbal 50 to a point shown in Figure 7 (wiper 135 being out of engagement with both sectors 132 and 133) the circuit providing a redundant ground for the caging relay winding 151 is removed. Since this was the last remaining energization path for the caging relay 150 the caging relay will now be de-enrgized. The position or attitude of the rotor case 60 at its instant corresponds to the rotor case being at its exact null position with respect to the auxiliary gimbal 50. Variations on the means for de-energizing the caging relay 150 are contemplated by the present invention. Thus, for example, instead of having the rotor case returned to its exact null position relative to the auxiliary gimbal 50, the sectors 132 and 133 in the wiper 135 would be varied in angular relationship so that the release of the rotor case would be effected at some other point. Further, the invention contemplates that instead of having a special sector 130 used for the purpose of de-energizing the caging relay 150, that means including the inductive pickoff means 61 could be used for sensing when the rotor case is at a preselected attitude for causing de-energization of the caging relay 150. A further variation on this same matter is to use the mercury switch means which normally control the torque motor means for de-energizing the caging relay 150. The main intent of the invention is to have means sensing some preselected attitude or position of the rotor case which will cause de-energization of the caging relay 150 and thus initiate a complete uncaging of the gyro and a return to the mode of operation whereat the servomotor 85 is controlled in the usual manner including means 61, 65, 70 and 75.

Figure 4:
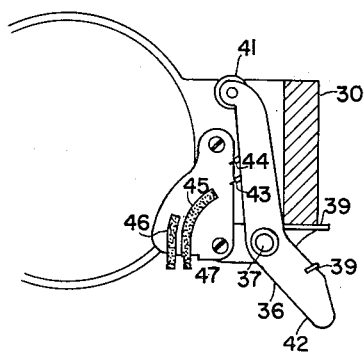
Figure 4 is a detailed view of the caging lever arm and the switch means operated thereby.

As the caging relay 150 is de-energized, its movable contact 152 then is disengaged from its in contact 153 which removes the ground 205 from the lead 207 which was in the energization circuit for both the amplifier transfer relay winding 161 and the rotary solenoid winding for the rotary solenoid 100. Movable member 102 of the rotary solenoid 100 is thus returned from its dotted line position as shown in Figures 5 and 7 to the full line position at which point it no longer is in engagement with the stop engaging surface 42 of the caging lever arm 36. When the member 102 no longer engages lever arm 36 then the resilient bias means 39 associated therewith will return the caging lever arm 36 to the position as shown in Figures 3 and 4. This action disengages wipers 44 and 43 from sectors 46 and 45 respectively. The disengagement of wiper 43 from sector 45 de-energizes the servomotor high level energization relay 180. The auxiliary gimbal centered relay 190 is not de-energized, however, by wiper 44 being disengaged from sector 46 due to the fact that there is an auxiliary ground for winding 191 through lead 215, in contact 194 and movable contact 192 of the relay 190, lead 204 to ground 205. The function of relay 190 remaining energized even after the gyro is caged and centered is to prevent ground 205 being reconnected to lead 203 and thus prevent the caging relay 150 from being re-energized. Further, the solenoid energizing relay 170 will remain energized due to a holding circuit established by virtue of its movable contact 174 and its cooperating in contact 173, movable contact 174 being connected to ground through lead 206 and in contact 173 being connected to the other side of the winding 171.

The de-energization of the amplifier transfer relay 160 disconnected the source of alternating current 212 from the control winding 86 of the servomotor 85 and reconnected the lead 73 of the magnetic amplifier 75 to the lead 79 and 80 of the servomotor thus enabling the servomotor to be once again controlled as a function of any output from the inductive pickoff means 61.

Relays 170 and 190 will remain energized as long as the caging switch 200 remains closed. If it is desired to once again cage the gyroscope then switch 200 must be opened and then reclosed at which point the entire caging sequence will be repeated with the caging relay 150 first being energized, etc.

While we have shown and described a specific embodiment of this invention, further modifications and improvements will occur to those skilled in the art. We desire it to be understood, therefore, that this invention is not to be limited to the particular form shown and we intend in the appended claims to cover all modifications which do not depart from the spirit and scope of this invention.

What we claim is:

1. A centering and caging apparatus for a gyroscope having a rotor mounted in a rotor case, a universal support for said rotor case including a base, a main gimbal mounted on said base for movement about an axis and an auxiliary gimbal mounted on said main gimbal for movement about an axis perpendicular to the axis of the main gimbal, said case being pivotally mounted on the auxiliary gimbal for movement about an axis that is perpendicular to the axis of the auxiliary gimbal, a two part pickoff including a first part positioned by the rotor case and a second part on the auxiliary gimbal, and servomotor means operable to move said main gimbal about its axis responsive to the output of said pickoff upon tilt of the rotor case about its axis relative to the auxiliary gimbal, said centering and caging apparatus comprising: a caging lever arm pivotally mounted on said main gimbal and resiliently biased to a normal position, said arm having a cam follower on one end and a stop engaging surface on the other end; a stop member pivotally mounted on said base and rotatable upon a caging command from a normal position to a caging position, said stop member in said caging position being adapted to be engaged by said stop engaging surface of said caging lever arm upon rotation of said main gimbal about said main gimbal axis; a heart shaped cam member mounted on said auxiliary gimbal and positioned so as to be contacted by said cam follower when said caging arm is rotated away from said normal position; means responsive to a caging command for shifting the control of said servomotor means from said pickoff to a fixed energization and for rotating said stop member from said normal position to said caging position, said fixed energization of said servomotor means causing said main gimbal to be rotated about its axis to a position where said stop member engages said stop engaging surface on said other end of said caging lever arm and causes said caging lever arm to be rotated from its normal position so as to engage said cam follower with said cam and center said auxiliary gimbal relative to said main gimbal; and means responsive to said rotor case rotating to a preselected attitude relative to said auxiliary gimbal for removing the fixed energization from said servomotor means and returning the control of said servomotor means to said pickoff and for returning said stop means to said normal position thereof.

2. A centering and caging apparatus for a gyroscope having a rotor mounted in a rotor case, a universal support for said rotor case including a base, a main gimbal mounted on said base for movement about an axis and an auxiliary gimbal mounted on said main gimbal for movement about an axis perpendicular to the axis of the main gimbal, said case being pivotally mounted on the auxiliary gimbal for movement about an axis that is perpendicular to the axis of the auxiliary gimbal, pickoff means including first means on the rotor case and second means on the auxiliary gimbal, and servomotor means operable to move said main gimbal about its axis responsive to the output of said pickoff means upon movement of the rotor case about its axis relative to the auxiliary gimbal, said centering and caging apparatus comprising: a caging arm movably mounted on said main gimbal and resiliently biased to a normal position, said arm having cam follower means and stop engaging means; stop means mounted on said base and movable upon a caging command from a normal position to a caging position, said stop means in said caging position being adapted to be engaged by said stop engaging means of said caging arm upon rotation of said main gimbal about said main gimbal axis; cam means mounted on said auxiliary gimbal and positioned so as to be contacted by said cam follower means when said caging arm is moved away from said normal position; means responsive to a caging command for disconnecting said servomotor means from said pickoff means and for energizing said servomotor means so as to rotate said main gimbal about its axis and for moving said stop means from said normal position to said caging position, said energization of said servomotor means causing said main gimbal to be rotated about its axis to a position where said stop means engages said stop engaging means on said caging arm and causes said caging arm to be moved from its normal position so as to engage said cam follower means with said cam means and to rotate said auxiliary gimbal relative to said main gimbal; and means responsive to said rotor case rotating to a preselected attitude relative to said auxiliary gimbal for removing the fixed energization from said servomotor means and returning the control of said servomotor means to said pickoff and for returning said stop means to said normal position thereof.

3. A centering and caging apparatus for a gyroscope having a rotor mounted in a rotor case, a universal support for said rotor case including a base, a main gimbal mounted on said base for movement about an axis and an auxiliary gimbal mounted on said main gimbal for movement about an axis perpendicular to the axis of said main gimbal, said case being pivotally mounted on said auxiliary gimbal for movement about an axis that is perpendicular to the axis of said auxiliary gimbal, pickoff means for sensing relative movement between said rotor case and said auxiliary gimbal including first means positioned by said rotor case and second means on said auxiliary gimbal, and servomotor means operable to move said main gimbal about its axis responsive to the output of said pickoff means upon movement of the rotor case about its axis relative to the auxiliary gimbal, said centering and caging apparatus comprising: a caging lever arm pivotally mounted on said main gimbal and resiliently biased to a normal position, said arm having a cam follower on one end and a stop engaging surface on the other end; a stop member mounted on said base and movable upon a caging command from a normal position to a caging position, said stop member in said caging position being adapted to be engaged by said stop engaging surface of said caging lever arm upon rotation of said main gimbal about said main gimbal axis; a cam member mounted on said auxiliary gimbal and positioned so as to be contacted by said cam follower when said caging arm is rotated away from said normal position; means responsive to a caging command for shifting the control of said servomotor means from said pickoff means to a fixed energization and for moving said stop member from said normal position to said caging position, said fixed energization of said servomotor means causing said main gimbal to be rotated about its axis to a position where said stop engages said stop engaging surface on said other end of said caging lever arm and causes said caging lever arm to be rotated from its normal position so as to engage said cam follower with said cam and center said auxiliary gimbal relative to said main gimbal; means responsive to said auxiliary gimbal being centered relative to said main gimbal for rotating said rotor case relative to said auxiliary gimbal; and means responsive to said rotor case rotating to a preselected attitude for removing the fixed energization from said servomotor means, for returning the control of said servomotor means to said pickoff means and for returning said stop means to said normal position thereof.

4. A centering and caging apparatus for a gyroscope having a rotor mounted in a rotor case, a universal support for said rotor case including a base, a main gimbal mounted on said base for movement about an axis and an auxiliary gimbal mounted on said main gimbal for movement about an axis perpendicular to the axis of said main gimbal, said case being pivotally mounted on said auxiliary gimbal for movement about an axis that is perpendicular to the axis of said auxiliary gimbal, pickoff means including means on said rotor case and means on said auxiliary gimbal, and servomotor means operable to move said main gimbal about its axis responsive to the output of said pickoff means upon movement of said rotor case about its axis relative to said auxiliary gimbal, said centering and caging apparatus comprising: means disconnecting said pickoff means from said servomotor means and energizing said servomotor means so that it tends to rotate said main gimbal continuously in one direction about said main gimbal axis; means normally ineffective to affect the rotation of said main gimbal but effective upon a caging command to limit the rotation of said main gimbal; means responsive to said normally ineffective means limiting the rotation of said main gimbal for rotating said auxiliary gimbal relative to said main gimbal; means responsive to said auxiliary gimbal being rotated to a preselected position relative to said main gimbal for rotating said rotor case relative to said auxiliary gimbal; and means responsive to said auxiliary gimbal and said rotor case rotating relative to said main gimbal and said auxiliary gimbal respectively to preselected positions for disabling said disconnecting means and said normally ineffective means so that the control of said servomotor means is returned to said pickoff means.

5. A centering and caging apparatus for a gyroscope having a rotor mounted in a rotor case, a universal support for said rotor case including a base, a main gimbal mounted on said base for movement about an axis and an auxiliary gimbal mounted on said main gimbal for movement about an axis perpendicular to the axis of said main gimbal, said case being pivotally mounted on said auxiliary gimbal for movement about an axis that is perpendicular to the axis of said auxiliary gimbal, pickoff means for sensing relative movement between said rotor case and said auxiliary gimbal including means on said rotor case and means on said auxiliary gimbal, and servomotor means operable to move said main gimbal about its axis responsive to the output of said pickoff means upon movement of said rotor case about its axis relative to said auxiliary gimbal, said centering and caging apparatus comprising: means energizing said servomotor means so that it tends to rotate said main gimbal continuously in one direction about said main gimbal axis; means normally ineffective to limit the rotation of said main gimbal but effective upon a caging command to limit the rotation of said main gimbal; means responsive to said normally ineffective means limiting the rotation of said main gimbal for rotating said auxiliary gimbal relative to said main gimbal; and means responsive to said auxiliary gimbal being rotated to a preselected position relative to said main gimbal for rotating said rotor case relative to said auxiliary gimbal.

6. A centering and caging apparatus for a gyroscope having a rotor mounted in a rotor case; a universal support for said rotor case including a base, a main gimbal mounted on said base for movement about an axis and an auxiliary gimbal mounted on said main gimbal for movement about an axis perpendicular to the axis of said main gimbal, said case being pivotally mounted on said auxiliary gimbal for movement about an axis that is perpendicular to the axis of said auxiliary gimbal; pickoff means for sensing relative movement between said rotor case and said auxiliary gimbal including means on said rotor case and means on said auxiliary gimbal, and servomotor means operable to move said main gimbal about its axis responsive to the output of said pickoff means upon movement of said rotor case about its axis relative to said auxiliary gimbal, said centering and caging apparatus comprising: means controlling said servomotor means to rotate said main gimbal in one direction about said main gimbal axis; means normally ineffective to limit the rotation of said main gimbal but enabled upon a caging command to limit the rotation of said main gimbal; means responsive to said normally ineffective means limiting the rotation of said main gimbal for rotating said auxiliary gimbal to a preselected position relative to said main gimbal; and means responsive to said rotor case rotating relative to said auxiliary gimbal to a preselected position for disabling said controlling means and said normally ineffective means.

7. A centering and caging apparatus for a gyroscope having a rotor mounted in a rotor case; a universal support for said rotor case including a base, a main gimbal mounted on said base for movement about an axis and an auxiliary gimbal mounted on said main gimbal for movement about an axis perpendicular to the axis of said main gimbal, said case being pivotally mounted on said auxiliary gimbal for movement about an axis that is perpendicular to the axis of said auxiliary gimbal; pickoff means for sensing relative movement between said rotor case and said auxiliary gimbal including means on said rotor case and means on said auxiliary gimbal, and servomotor means operable to move said main gimbal about its axis responsive to the output of said pickoff means upon movement of said rotor case about its axis relative to said auxiliary gimbal, said centering and caging apparatus comprising: means disconnecting said pickoff means from said servomotor means and energizing said servomotor means at a first level so that it tends to rotate said main gimbal continuously in one direction about said main gimbal axis; means normally ineffective to affect the rotation of said main gimbal but effective upon a caging command to limit the rotation of said main gimbal; means responsive to said normally ineffective means limiting the rotation of said main gimbal for increasing the level of energization of said servomotor means above said first level and for rotating said auxiliary gimbal relative to said main gimbal; means responsive to said auxiliary gimbal being rotated to a preselected position relative to said main gimbal for rotating said rotor case relative to said auxiliary gimbal; and means responsive to said rotor case rotating to a preselected attitude for disabling said disconnecting means and said normally ineffective means so that the control of said servomotor means is returned to said pickoff means.

8. A caging apparatus for a gyroscope having a rotor mounted in a rotor case, a universal support for said rotor case including a support, a main gimbal mounted on said support for movement about an axis and an auxiliary gimbal mounted on said main gimbal for movement about an axis perpendicular to the axis of said main gimbal, said case being pivotally mounted on said auxiliary gimbal for movement about an axis that is perpendicular to the axis of said auxiliary gimbal, pickoff means for sensing relative movement between said rotor case and said auxiliary gimbal including means on said rotor case and means on said auxiliary gimbal, and servomotor means operable to move said main gimbal about its axis responsive to the output of said pickoff means upon movement of said rotor case about its axis relative to said auxiliary gimbal, said centering and caging apparatus comprising: means for disabling the control of said servomotor means by said pickoff means and for controlling said servomotor means so as to rotate said main gimbal about said main gimbal axis; means normally ineffective to limit the rotation of said main gimbal but enabled upon a caging command to limit the rotation of said main gimbal; means responsive to said normally ineffective means limiting the rotation of said main gimbal for rotating said auxiliary gimbal to a preselected position relative to said main gimbal; means responsive to said auxiliary gimbal being rotated to said preselected position relative to said main gimbal for rotating said rotor case relative to said auxiliary gimbal and means responsive to said rotor case being moved to a preselected attitude for returning the control of said servomotor means to said pickoff means.

9. A centering and caging apparatus for a redundant gimbal gyro comprising: a base; a main gimbal mounted on said base for rotation about a first axis; an auxiliary gimbal mounted on said main gimbal for rotation about a second axis perpendicular to said first axis; a rotor case mounted on said auxiliary gimbal for rotation about a third axis perpendicular to said second axis; stop means for limiting the rotation of said rotor case relative to said auxiliary gimbal; means for rotating said main gimbal about said first axis; means selectively operable to limit the rotation of said main gimbal about said first axis so that said main gimbal is stopped at a preselected position relative to said base; means operated as a result of the limiting of the rotation of said main gimbal to apply a rotative force to said auxiliary gimbal so as to tend to rotate said auxiliary gimbal about said second axis, said rotative force first being effective to cause said rotor case to engage said rotor case stop means through precessive action so as to destroy spatial rigidity of said gyroscope and then being effective to rotate said auxiliary gimbal about said second axis; means included in said auxiliary gimbal rotating means for rotating said auxiliary gimbal to a preselected angular position relative to said main gimbal; means for rotating said rotor case about said third axis once said auxiliary gimbal has been rotated to said preselected angular position relative to said main gimbal; and means responsive to said rotor case being rotated about said third axis to a preselected angular attitude for rendering inoperable said main gimbal limiting means.

10. A caging apparatus for a multiple gimbal gyro comprising: a support; a first gimbal mounted on said support for rotation about a first axis; a second gimbal mounted on said first gimbal for rotation about a second axis perpendicular to said first axis; a third gimbal supporting a gyro rotor and mounted on said second gimbal for rotation about a third axis perpendicular to said second axis; stop means for limiting the rotation of said third gimbal relative to said second gimbal; means for rotating said first gimbal about said first axis; means selectively operable to limit the rotation of said first gimbal about said first axis so that said first gimbal is stopped at a preselected position relative to said support; means operated as a result of the limiting of the rotation of said first gimbal to apply a rotative force to said second gimbal so as to tend to rotate said second gimbal about said second axis, said rotative force first being effective to cause said third gimbal to engage said third gimbal stop means through precessive action so as to destroy spatial rigidity of said gyroscope and then being effective to rotate said second gimbal about said second axis; means included in said second gimbal rotating means for rotating said second gimbal to a preselected angular position relative to said first gimbal; means for rotating said third gimbal about said third axis once said second gimbal has been rotated to said preselected angular position relative to said first gimbal; and means responsive to said third gimbal being rotated about said third axis to a preselected angular attitude for rendering inoperable said first gimbal limiting means.

11. A centering and caging apparatus for a redundant gimbal gyro comprising: a base; a main gimbal mounted on said base for rotation about a first axis; an auxiliary gimbal mounted on said main gimbal for rotation about a second axis perpendicular to said first axis; a rotor case supporting a rotor for rotation about a spin axis and being mounted on said auxiliary gimbal for rotation about a third axis perpendicular to said second axis; stop means for limiting the rotation of said rotor case relative to said auxiliary gimbal; servomotor means for rotating said main gimbal about said first axis; means selectively operable to limit the rotation of said main gimbal about said first axis so that said main gimbal is stopped at a preselected position relative to said base; means operated as a result of the limiting of the rotation of said main gimbal to apply a rotative force to said auxiliary gimbal so as to tend to rotate said auxiliary gimbal about said second axis, said rotative force first being effective to cause said rotor case to engage said rotor case stop means through precessive action so as to destroy the spatial rigidity of said gyroscope and then being effective to rotate said auxiliary gimbal about said second axis; means included in said auxiliary gimbal rotating means for rotating said auxiliary gimbal to a preselected angular position relative to said main gimbal; and means for rotating said rotor case about said third axis once said auxiliary gimbal has been rotated to said preselected angular position relative to said main gimbal.

12. In a gyroscopic device having a base, a main gimbal and an auxiliary gimbal mounted on said base for rotation about two mutually perpendicular axes, a rotor case mounted on said auxiliary gimbal for rotation about an axis perpendicular to one of said two axes, and means for sequentially rotating said main gimbal, said auxiliary gimbal, and said rotor case about their respective axes to preselected angular positions.

13. In a gyroscopic device: a base, a main gimbal and an auxiliary gimbal mounted on said base for rotation about two mutually perpendicular axes, a rotor case mounted on said auxiliary gimbal for rotation about an axis perpendicular to one of said two axes, and means including servomotor means connected to said main gimbal for sequentially rotating said main gimbal, said auxiliary gimbal, and said rotor case about their respective axes to preselected angular positions.

14. In a gyroscopic device: a base, a main gimbal and an auxiliary gimbal mounted on said base for rotation about two mutually perpendicular axes, a rotor case mounted on said auxiliary gimbal for rotation about an axis perpendicular to one of said two axes, and servomotor means for sequentially rotating said main gimbal, said auxiliary gimbal, and said rotor case about their respective axes.

References Cited in the file of this patent
UNITED STATES PATENTS

| | | |
|---|---|---|
| 2,584,876 | Haskins, Jr. | Feb. 5, 1952 |
| 2,588,755 | Noxon | Mar. 11, 1952 |